United States Patent
Kawasaki et al.

(10) Patent No.: US 10,514,564 B2
(45) Date of Patent: Dec. 24, 2019

(54) DISPLAY UNIT

(71) Applicant: SONY CORPORATION, Tokyo (JP)

(72) Inventors: Yasunobu Kawasaki, Tokyo (JP); Yuki Takano, Tokyo (JP); Hisanori Tsuboi, Kanagawa (JP); Yuji Arai, Kanagawa (JP)

(73) Assignee: Sony Corporation (JP)

( * ) Notice: Subject to any disclaimer, the term of this patent is extended or adjusted under 35 U.S.C. 154(b) by 182 days.

(21) Appl. No.: 15/325,163

(22) PCT Filed: Jul. 3, 2015

(86) PCT No.: PCT/JP2015/069248
§ 371 (c)(1),
(2) Date: Jan. 10, 2017

(87) PCT Pub. No.: WO2016/021347
PCT Pub. Date: Feb. 11, 2016

(65) Prior Publication Data
US 2017/0163927 A1    Jun. 8, 2017

(30) Foreign Application Priority Data

Aug. 5, 2014 (JP) .................................. 2014-159574

(51) Int. Cl.
*G02F 1/1333* (2006.01)
*G09F 9/00* (2006.01)
(Continued)

(52) U.S. Cl.
CPC ...... *G02F 1/133308* (2013.01); *G06F 1/1601* (2013.01); *G06F 1/1605* (2013.01); *G06F 1/1637* (2013.01); *G06F 1/1652* (2013.01); *G09F 9/00* (2013.01); *G09F 9/30* (2013.01); *G09F 9/301* (2013.01); *H04N 5/642* (2013.01); *H04R 5/02* (2013.01);
(Continued)

(58) Field of Classification Search
CPC ... G02F 1/133308; G02F 2001/133317; G02F 2001/13332; G02F 2001/133328
See application file for complete search history.

(56) References Cited

U.S. PATENT DOCUMENTS 8,647,727 B1 *  2/2014  Barnidge .............. G02B 5/0242
                                                    156/60
2009/0096965 A1 *  4/2009  Nagata .............. G02F 1/133305
                                                    349/103
(Continued)

FOREIGN PATENT DOCUMENTS

JP    2004-069627 A    3/2004
JP    2005-331872 A   12/2005
(Continued)

*Primary Examiner* — Phu Vu
(74) *Attorney, Agent, or Firm* — Lerner, David, Littenberg, Krumholz & Mentlik, LLP

(57) ABSTRACT

A display unit (1) includes a transparent plate (11) and a display body. The transparent plate has a first surface and a second surface that are opposite to each other, and is disposed to allow substantially an entire region of the first surface to be exposed. The transparent plate has a curved shape that is bent in an arc shape in a first direction. The display body is joined to side of the second surface of the transparent plate to follow the curved shape.

13 Claims, 16 Drawing Sheets

(51) Int. Cl.
*G09F 9/30* (2006.01)
*H04R 5/02* (2006.01)
*G06F 1/16* (2006.01)
*H04N 5/64* (2006.01)

(52) U.S. Cl.
CPC ............ *G02F 2001/133317* (2013.01); *G02F 2001/133322* (2013.01); *G02F 2201/46* (2013.01); *H04N 5/64* (2013.01); *H04R 2201/021* (2013.01); *H04R 2499/15* (2013.01)

(56) References Cited

U.S. PATENT DOCUMENTS

2010/0113087 A1* 5/2010 Demuynck ............ H04M 1/035
  455/550.1
2016/0360628 A1* 12/2016 Yu ........................ G02B 6/0088
2017/0123257 A1* 5/2017 Zhao ................. G02F 1/133308

FOREIGN PATENT DOCUMENTS

| | | |
|---|---|---|
| JP | 2007-274069 A | 10/2007 |
| JP | 2009-020168 A | 1/2009 |
| JP | 2009-229667 A | 10/2009 |
| WO | 2010/125976 A1 | 11/2010 |
| WO | 2014/002688 A1 | 1/2014 |

* cited by examiner

[FIG. 1]
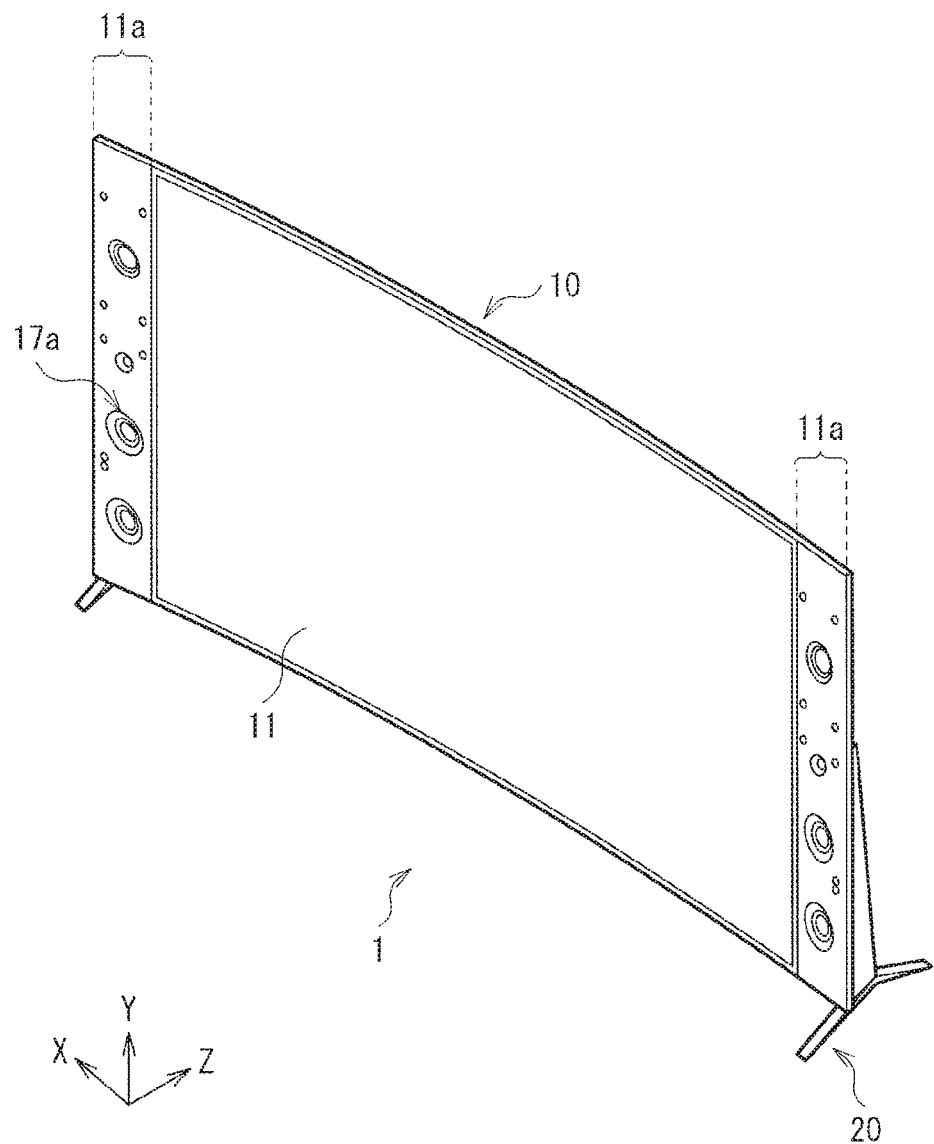

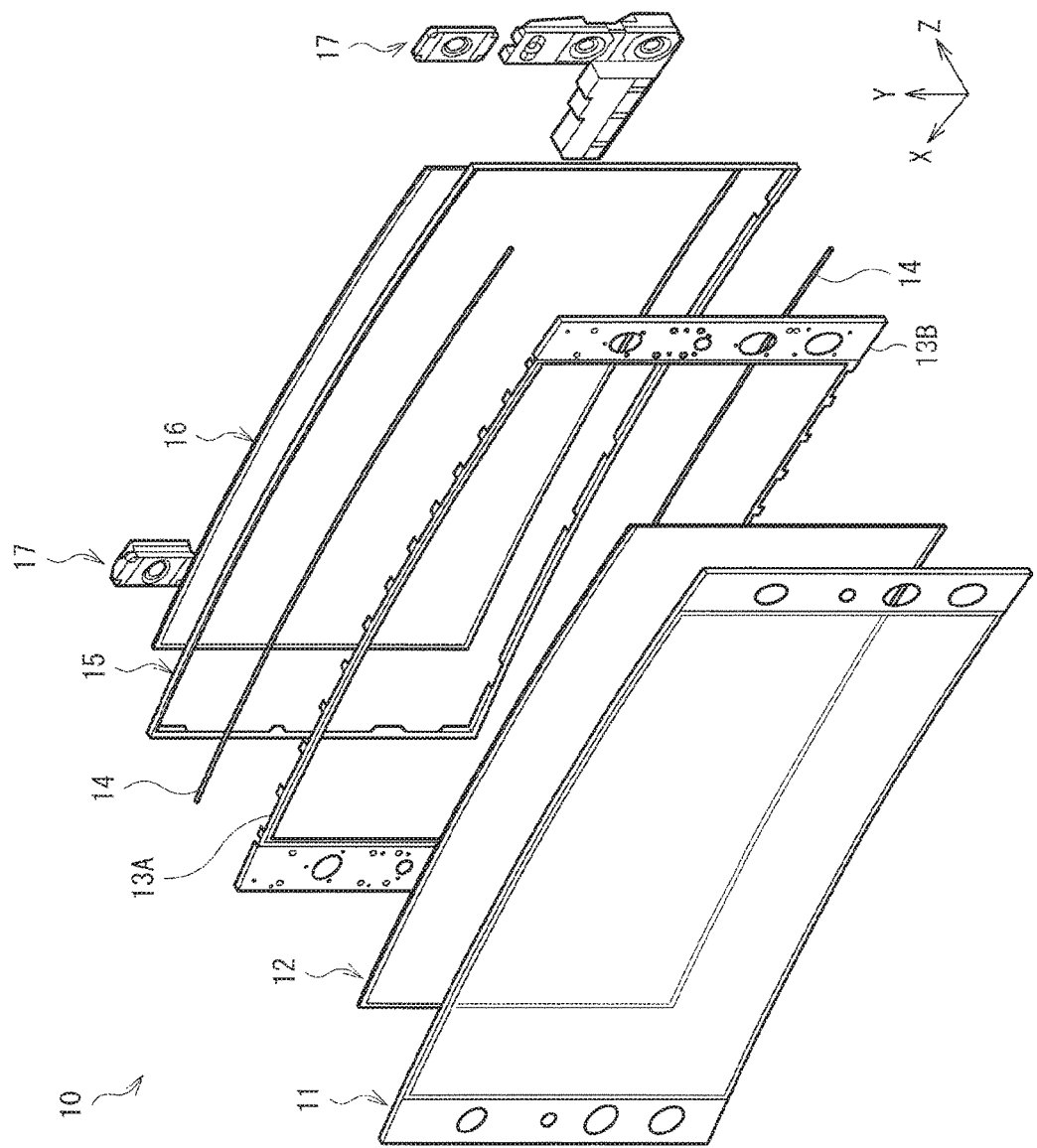
[FIG. 2]

[ FIG. 3A ]
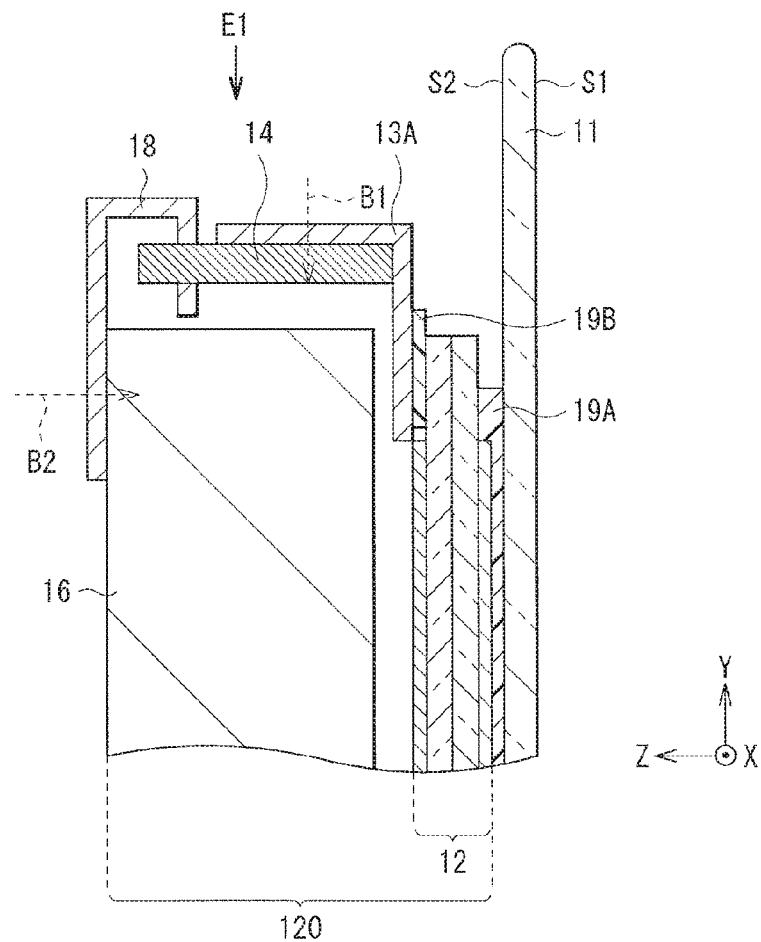
[ FIG. 3B ]
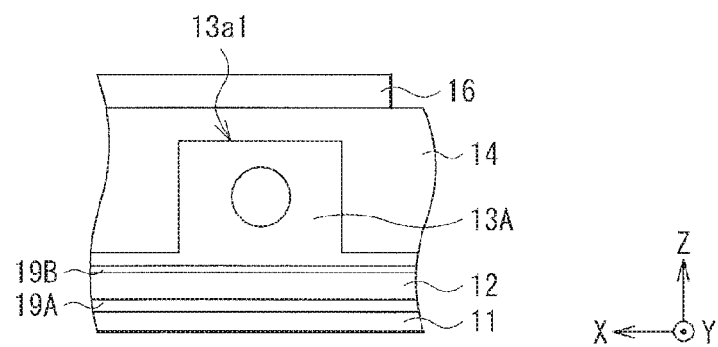

[FIG. 4]
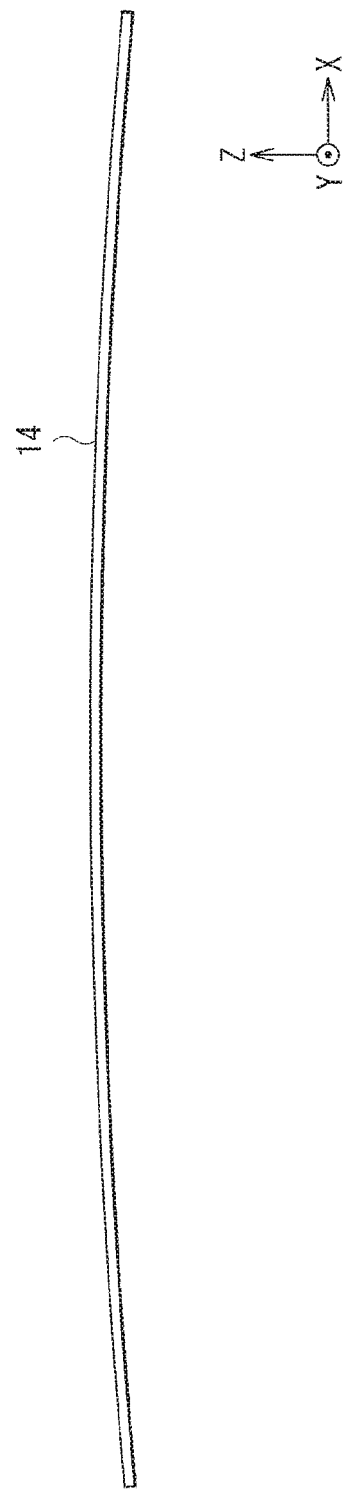

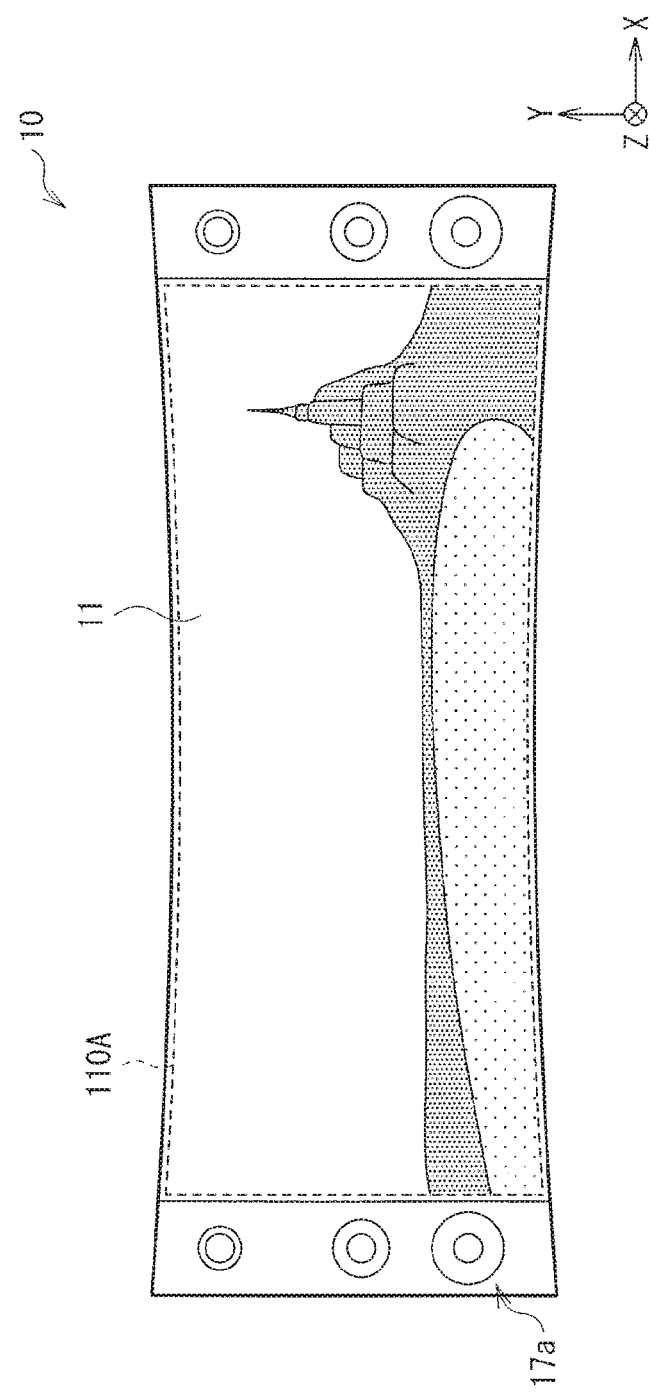

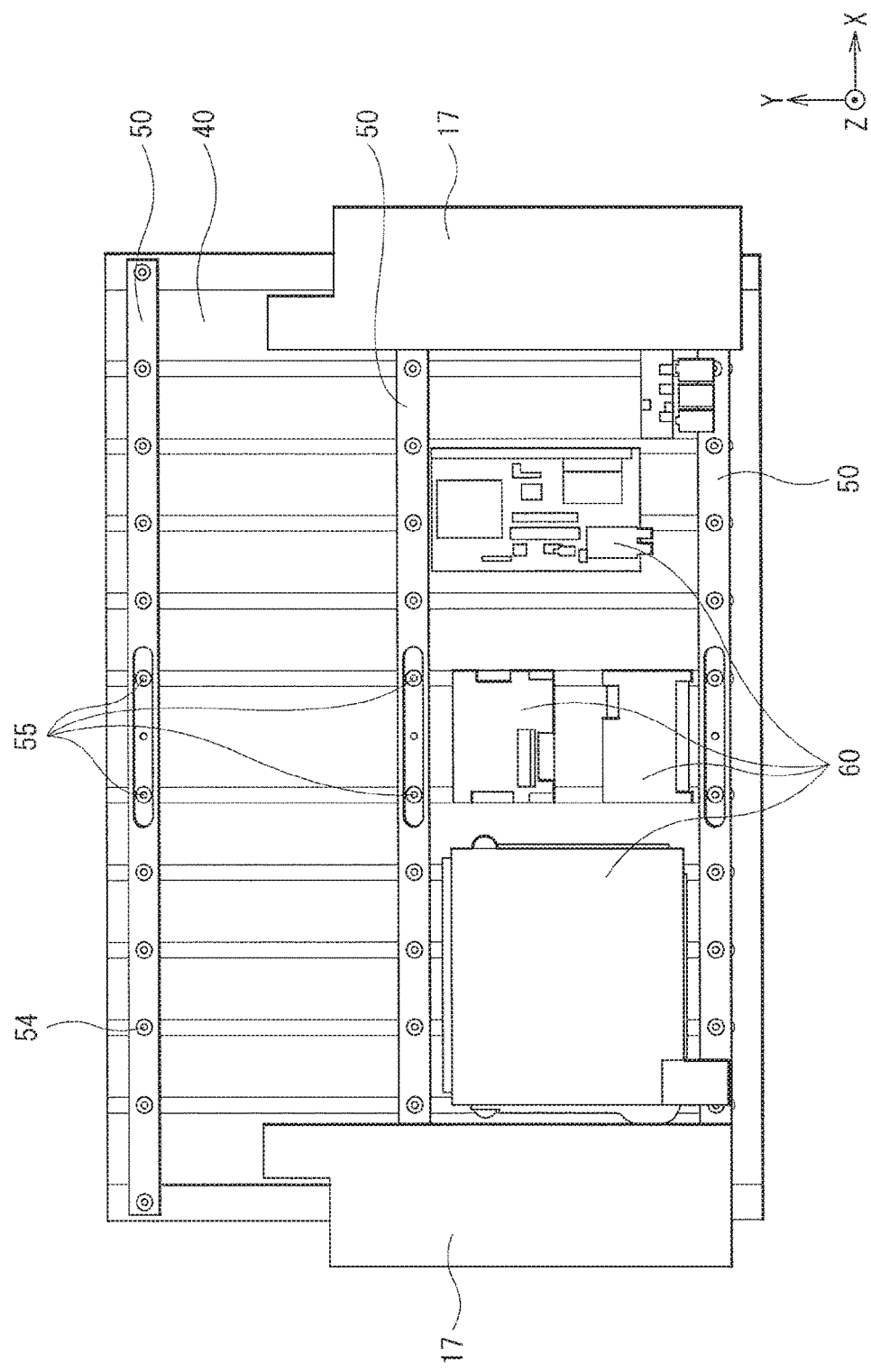

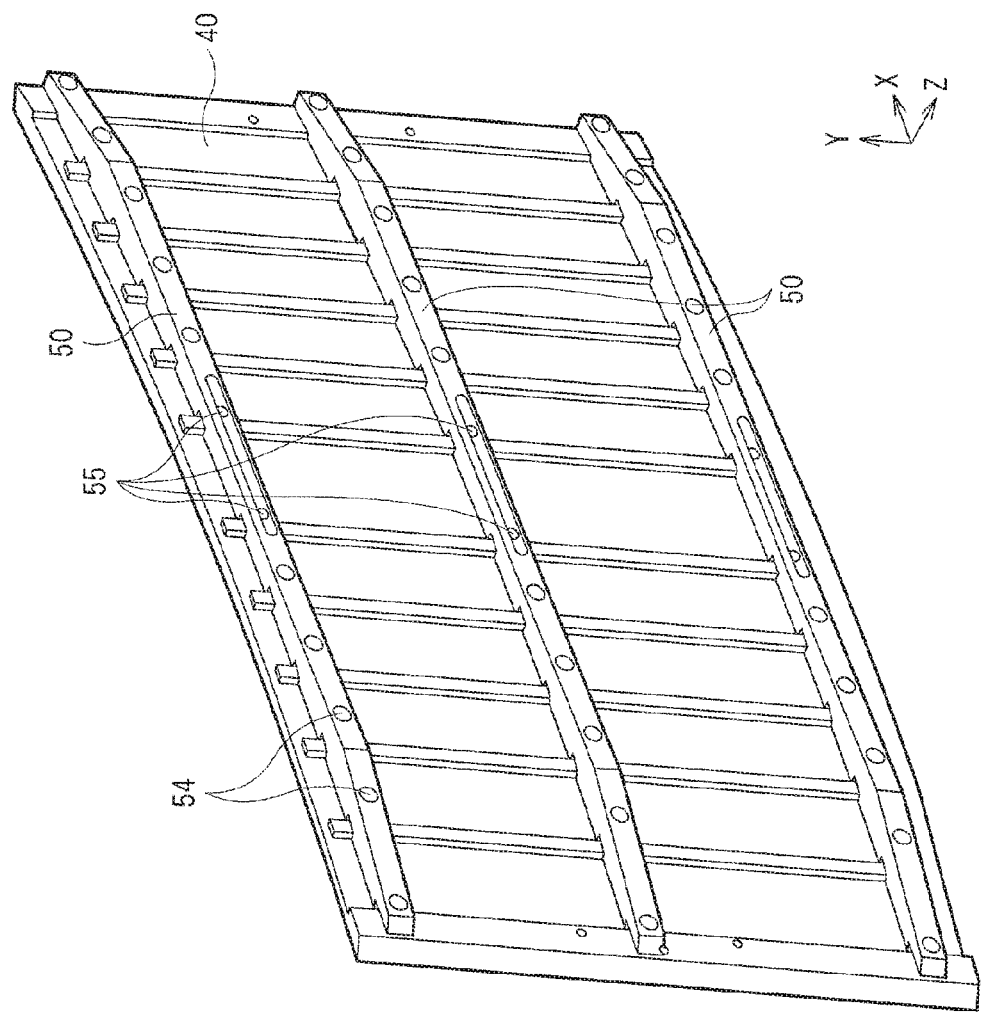
[FIG. 6B]

[ FIG. 7A ]
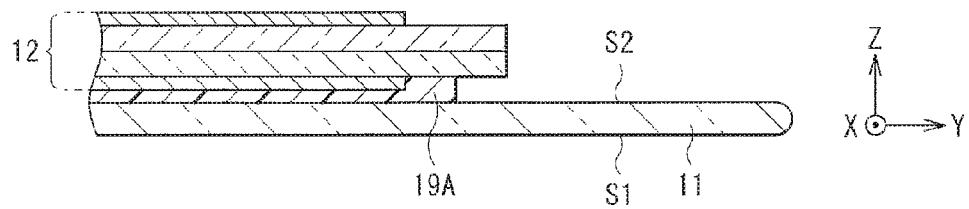
[ FIG. 7B ]
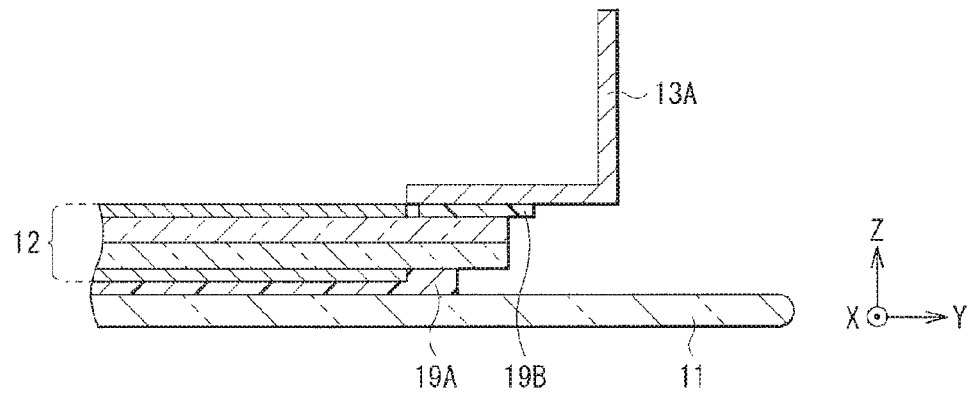
[ FIG. 7C ]
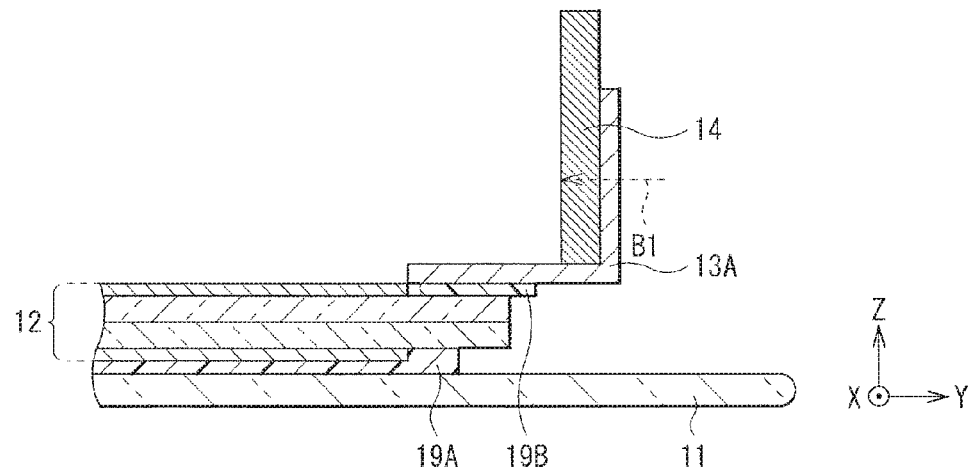

[ FIG. 8A ]
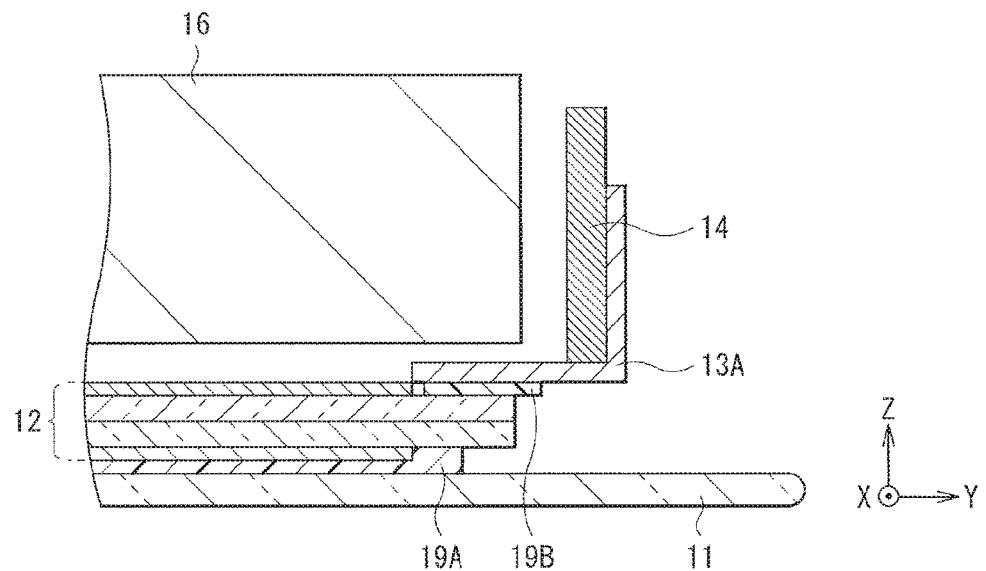
[ FIG. 8B ]
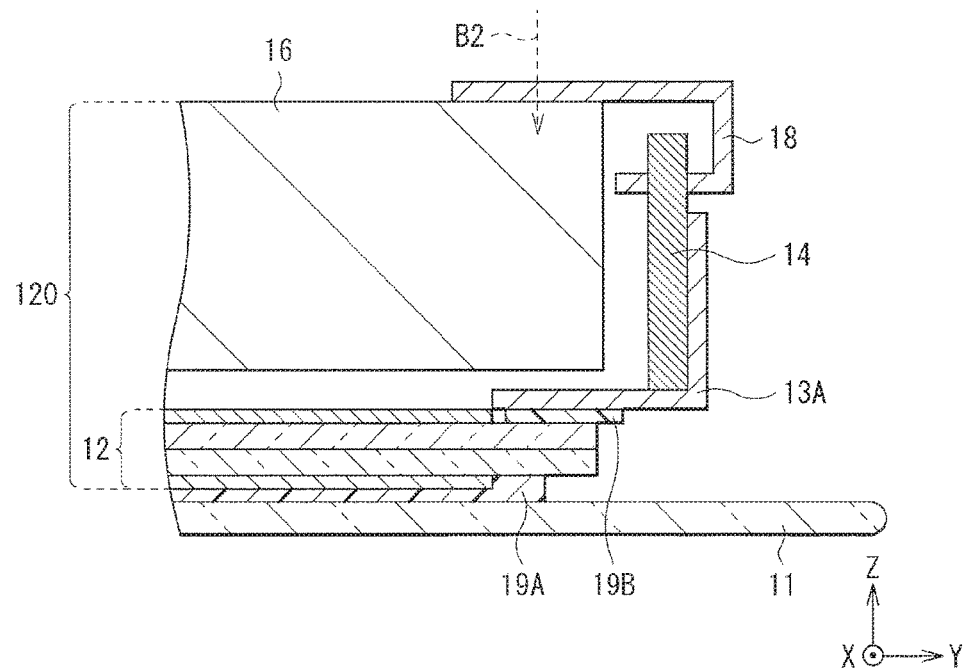

[ FIG. 9A ]
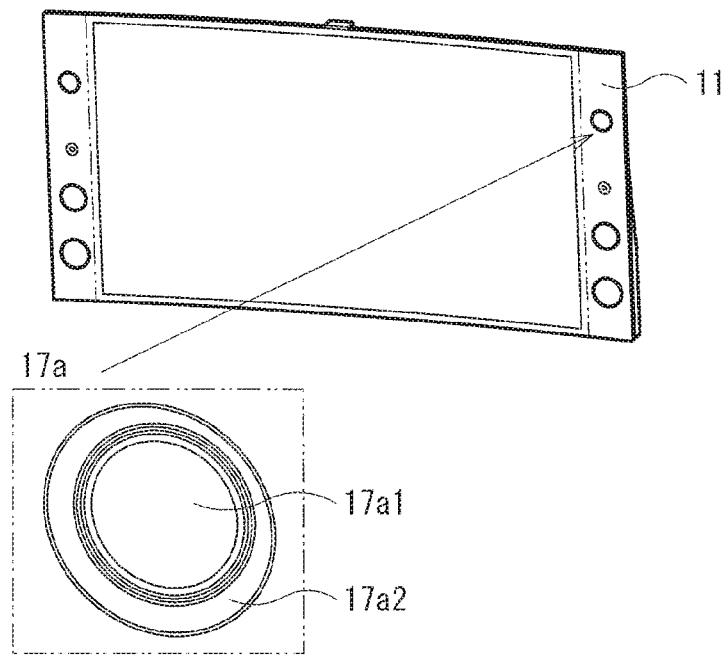
[ FIG. 9B ]
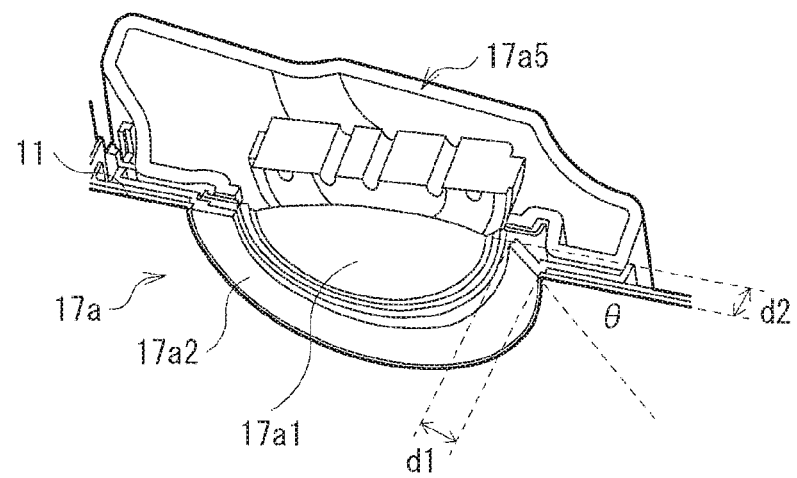

[ FIG. 9C ]
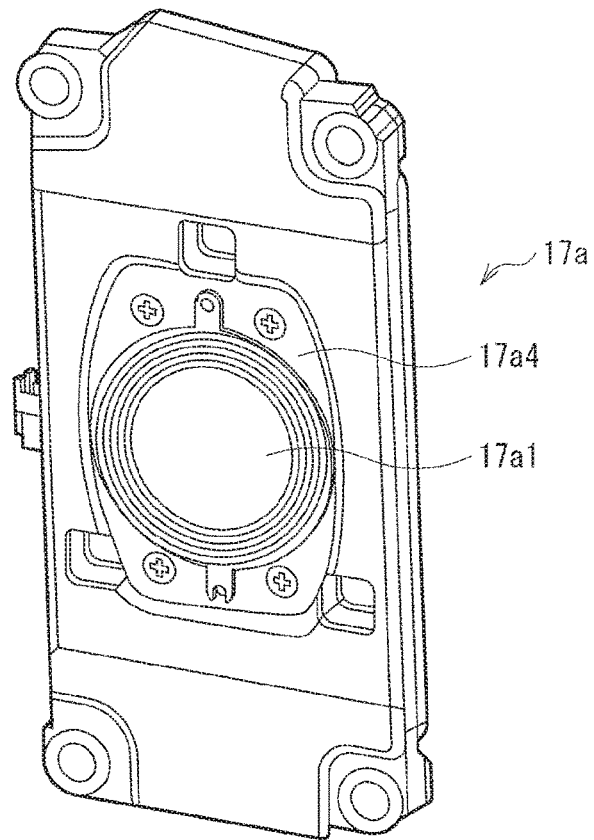
[ FIG. 10 ]
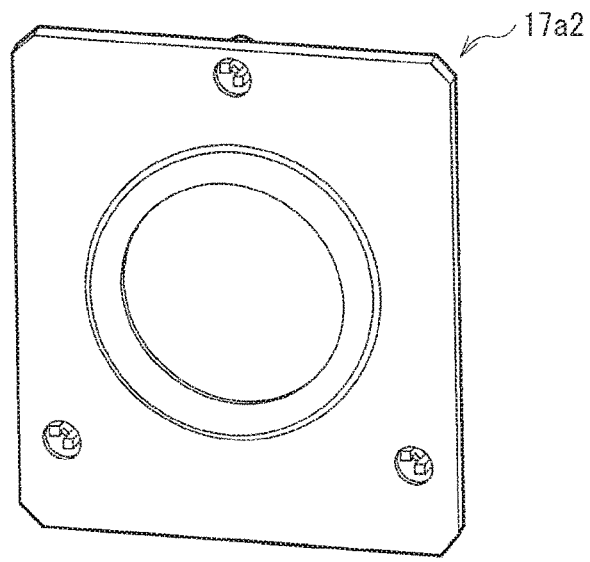

[ FIG. 11A ]
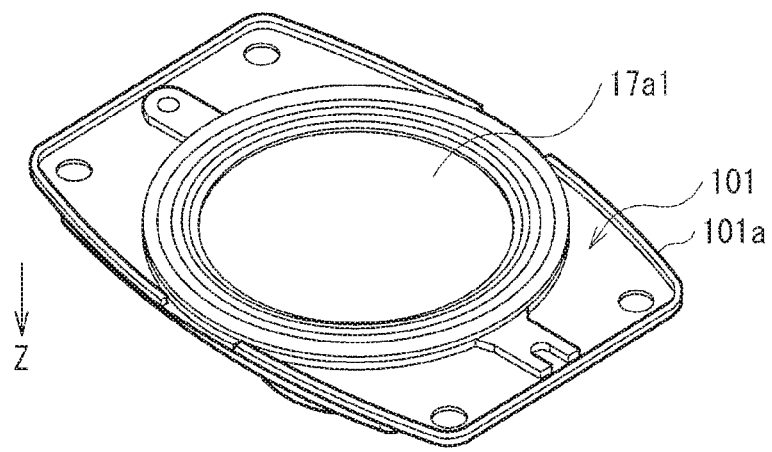
[ FIG. 11B ]
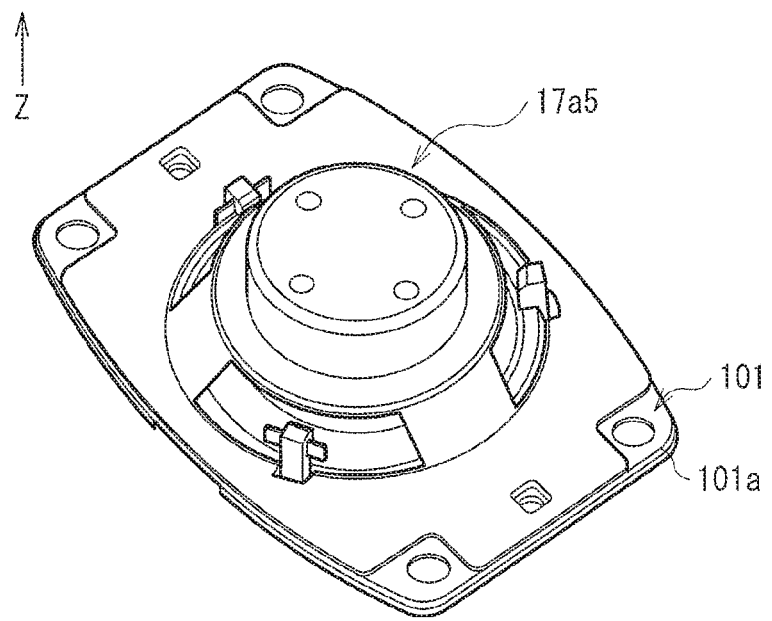

[ FIG. 12A ]
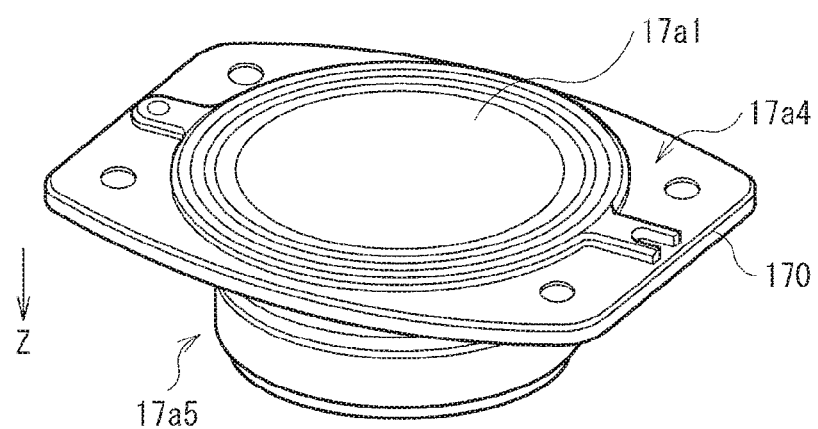
[ FIG. 12B ]
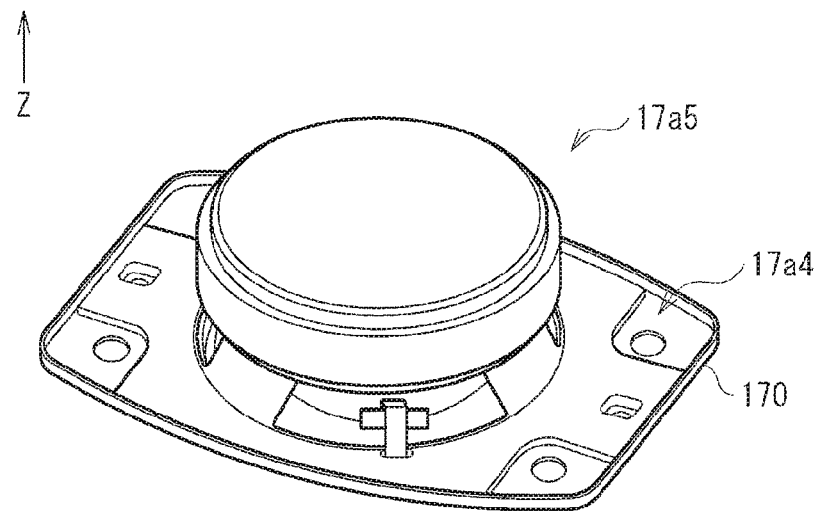

[ FIG. 13 ]
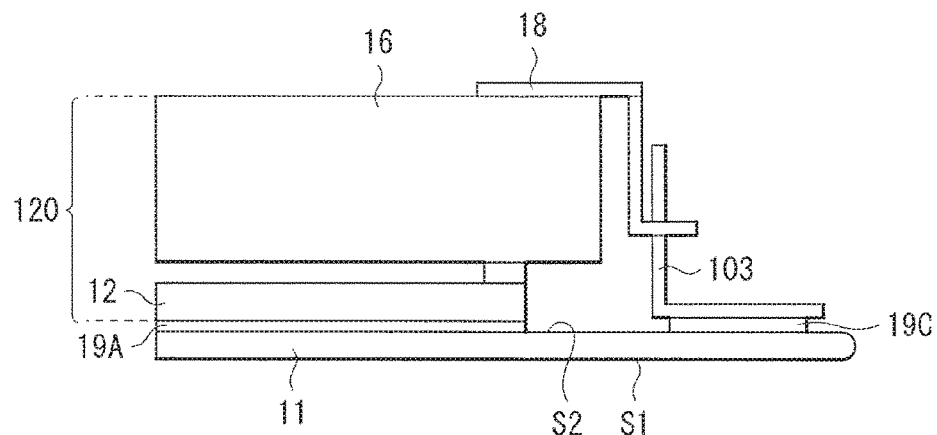
[ FIG. 14 ]
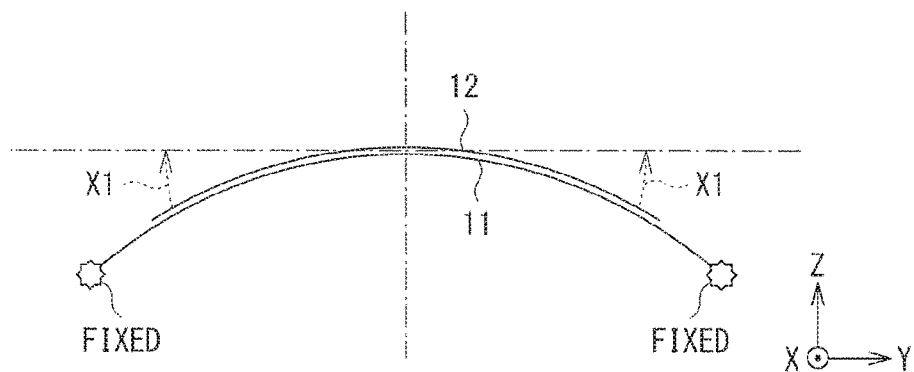
[ FIG. 15 ]
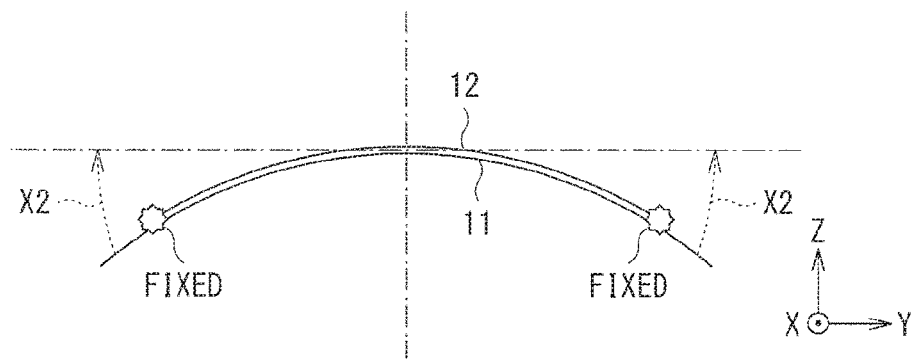

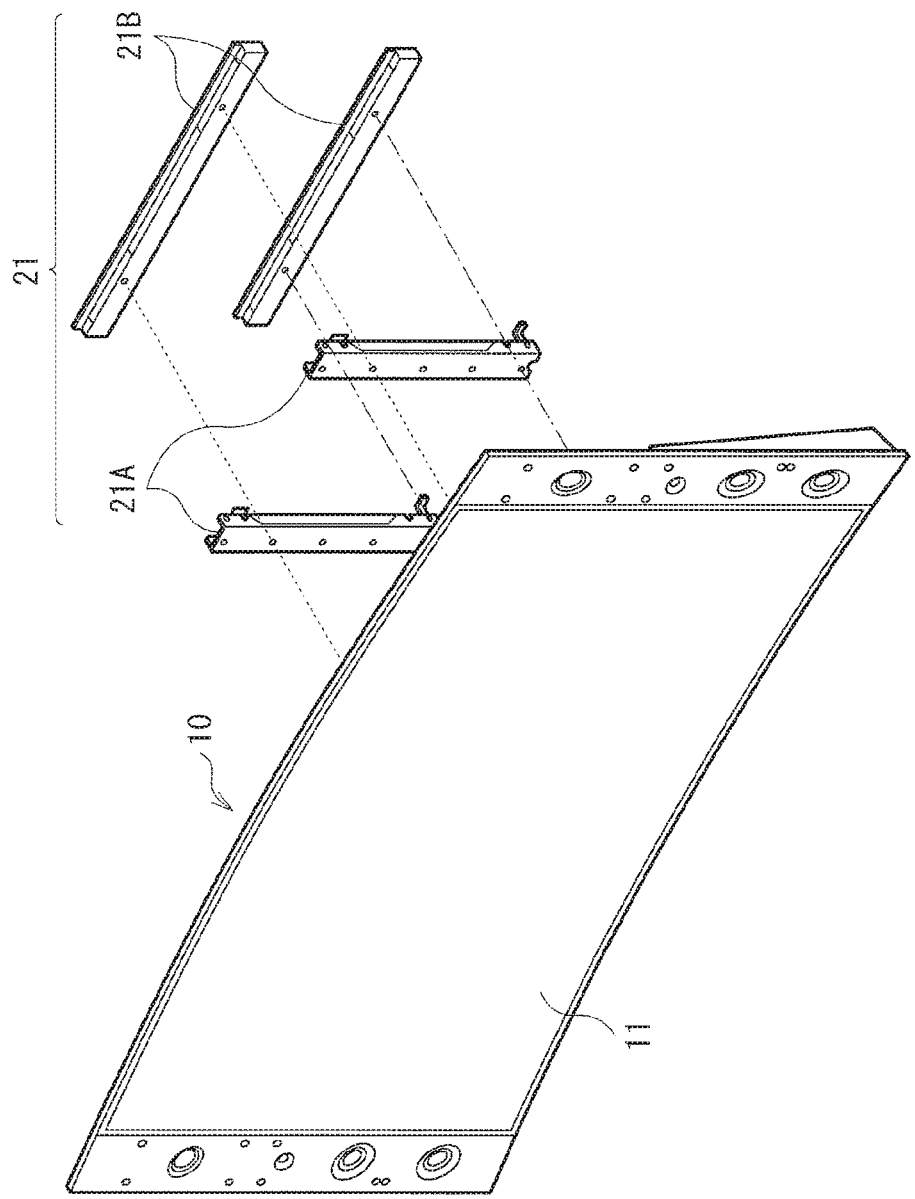
[FIG. 16]

[ FIG. 17A ]
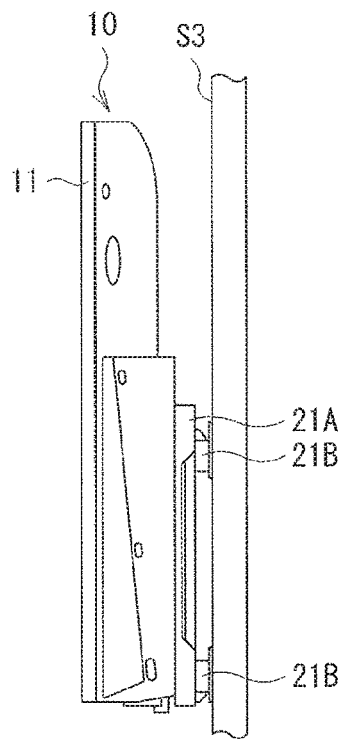
[ FIG. 17B ]
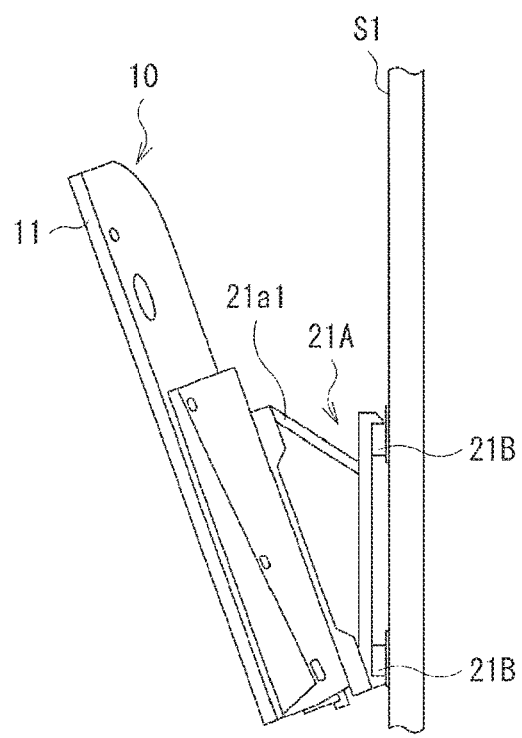

DISPLAY UNIT

CROSS REFERENCE TO RELATED APPLICATIONS

This application is a U.S. National Phase of International Patent Application No. PCT/JP2015/069248 filed on Jul. 3, 2015, which claims priority benefit of Japanese Patent Application No. JP 2014-159574 filed in the Japan Patent Office on Aug. 5, 2014. Each of the above-referenced applications is hereby incorporated herein by reference in its entirety.

TECHNICAL FIELD

The disclosure relates to a display unit suitable for a large-sized television, for example.

BACKGROUND ART

A screen of a display unit is generally planar. However, a screen that is curved and deformed in an arc shape has also been proposed (e.g., PTLs 1 and 2).

CITATION LIST

Patent Literature

PTL 1: Japanese Unexamined Patent Application Publication No. 2005-331872
PTL 2: Japanese Unexamined Patent Application Publication No. 2009-20168

SUMMARY OF INVENTION

However, the display units as mentioned above have a room for improvement in quality of design in that a peripheral portion of a front surface (surface on a display side) is covered with a member such as a frame.

Therefore, it is desirable to provide a display unit that has high-quality design, and makes it possible to achieve image display full of feeling of presence.

A display unit according to an embodiment of the disclosure includes a transparent plate and a display body. The transparent plate has a first surface and a second surface that are opposite to each other, and is disposed to allow substantially an entire region of the first surface to be exposed. The transparent plate has a curved shape that is bent in an arc shape in a first direction. The display body is joined to side of the second surface of the transparent plate to follow the curved shape.

According to the display unit of an embodiment of the disclosure, the display body is joined to the side of the second surface of the transparent plate having the curved shape that is bent in the arc shape in the first direction to follow the curved shape. Such a curved shape makes it possible to enhance a sense of unity and a sense of immersion of a user. By disposing the transparent plate to allow substantially the entire region of the first surface to be exposed, the quality of design is enhanced compared with a case where a peripheral portion of the transparent plate is covered with a frame-shaped member such as a so-called bezel.

According to the display unit of an embodiment of the disclosure, the transparent plate having the curved shape that is bent in the arc shape in the first direction is disposed to allow substantially the entire region of the first surface to be exposed, and the display body is joined to the side of the second surface to follow the curved shape of the transparent plate. This makes it possible to achieve high-quality design and image display full of feeling of presence.

Note that the above-described contents are examples of the disclosure. Effects of an embodiment of the disclosure are not limited to those described above, and may be effects other than those described above or may further include other effects.

BRIEF DESCRIPTION OF DRAWINGS

FIG. 1 is a perspective view of an outer appearance of a display unit according to an embodiment of the disclosure.

FIG. 2 is an exploded perspective view of a configuration of a key portion of the display unit illustrated in FIG. 1.

FIG. 3A is a cross-sectional view of the key portion of a configuration of the display unit illustrated in FIG. 1 near a peripheral portion.

FIG. 3B is a side view of a configuration near the peripheral portion illustrated in FIG. 3A as viewed in a direction of an arrow E1.

FIG. 4 is a top view of an example of a bow-shaped frame member.

FIG. 5 is a schematic view for describing a visual effect brought by a curved shape.

FIG. 6A is a rear view of an example of a configuration of the display unit illustrated in FIG. 1, with an exterior member being detached from the display unit, as viewed from rear side.

FIG. 6B is a perspective view of an example of a configuration of a plate member and a frame member illustrated in FIG. 6A, as viewed from the rear side.

FIG. 7A is a schematic cross-sectional view for describing a method for assembling the display unit illustrated in FIG. 1.

FIG. 7B is a schematic cross-sectional view for describing a step subsequent to FIG. 7A.

FIG. 7C is a schematic cross-sectional view for describing a step subsequent to FIG. 7B.

FIG. 8A is a schematic cross-sectional view for describing a step subsequent to FIG. 7C.

FIG. 8B is a schematic cross-sectional view for describing a step subsequent to FIG. 8A.

FIG. 9A is a diagram illustrating a configuration of a portion near a speaker element in an enlarged manner together with a configuration of a main body section.

FIG. 9B is a cross-sectional view of a key portion of the speaker element illustrated in FIG. 9A for describing an internal configuration of the speaker element.

FIG. 9C is a perspective view of an outer appearance of the speaker element illustrated in FIG. 9A.

FIG. 10 is a perspective view of a configuration of an ornamental component.

FIG. 11A is a perspective view for describing a configuration of a plate member of a speaker element according to Comparative Example 1.

FIG. 11B is a perspective view for describing the configuration of the plate member of the speaker element according to Comparative Example 1.

FIG. 12A is a perspective view for describing a configuration of a plate member of the speaker element illustrated in FIG. 9A.

FIG. 12B is a perspective view for describing the configuration of the plate member of the speaker element illustrated in FIG. 9A.

FIG. 13 is a cross-sectional view of a configuration of a peripheral portion of a display unit according to Comparative Example 2.

FIG. 14 is a schematic view for describing a function of the display unit illustrated in FIG. 13.

FIG. 15 is a schematic view for describing a function of the display unit illustrated in FIG. 1.

FIG. 16 is a perspective view of a configuration of a display unit according to a modification example.

FIG. 17A is a side view of an example of a state in which the display unit illustrated in FIG. 16 is used.

FIG. 17B is a side view of another example of a state in which the display unit illustrated in FIG. 16 is used.

DESCRIPTION OF EMBODIMENTS

Some embodiments of the disclosure are described in detail below with reference to drawings. Note that description is given in the following order.
1. Embodiment (an example of a display unit having a curved shape with a display body being joined to a bezel-less front plate)
2. Modification Example (an example of a wall-mounted type)

FIG. 1 illustrates an outer appearance of a display unit according to an embodiment of the disclosure as viewed from the front. FIG. 2 illustrates an exploded perspective configuration of a key portion of a display unit 1. The display unit 1 is suitably used for, for example, mid-sized to large-sized televisions, and has a configuration in which a flat plate-shaped main body section 10 for image display is supported by a stand 20. Note that description is herein given referring, as an example, to a case where the display unit 1 with the stand 20 being attached to the main body section 10 is placed on a surface of, for example, a floor, a shelf, or a table, and is used as a stationary type. However, as described later, the display unit 1 may also be used as the wall-mounted type, with the stand 20 being detached from the main body section 10.

In the present specification, a front-rear direction of the main body section 10 refers to a Z-direction. In a main surface (a relatively large surface of the surfaces) of the main body section 10, a right-left direction refer to an X-direction, and a top-bottom direction refers to a Y-direction.

The main body section 10 includes a front plate 11 on the forefront side (on the display side, at the front), for example. On the rear side (at the rear) of the front plate 11, there are disposed, for example, a liquid crystal panel 12, frame members (frames) 13A, 13B, 14, and 15, a light source section 16, and a speaker 17. Note that, although not illustrated, a rear surface of the main body section 10 is covered with a rear exterior member (rear cover), for example.

FIG. 3A illustrates a configuration of the main body section 10 in a YZ cross-section. In the main body section 10, the liquid crystal panel 12 is fastened (joined) to the rear side of the front plate 11 with an adhesive layer 19A being interposed in between. A frame member 13A (second frame member) is fastened to a peripheral portion of the liquid crystal panel 12 with an adhesive layer 19B being interposed in between. A frame member 14 (first frame member) is fastened to the frame member 13A by means of screwing, for example. The light source section 16 is assembled into a space surrounded by the frame members 13A and 14. The light source section 16 is screwed to a frame member 18 (third frame member), and is fitted to the frame member 13A to be thereby fixed to the main body section 10. Hereinafter, a specific configuration of each of the components is described. Note that, herein, the frame member 18 is provided as a member separate from a frame member 15 illustrated in FIG. 2. However, the frame member 18 and the frame member 15 may be configured by the same member (the frame member 15 may also serve as the frame member 18).

The front plate 11 is configured by a transparent plate made of glass or plastic, for example. The surface shape (XY planar shape) of two main surfaces (a first surface S1 and a second surface S2) opposite to each other of the front plate 11 is a rectangular shape, for example. In the present embodiment, substantially the entire region of the first surface S1 of the front plate 11 on the front side is exposed, and a peripheral portion (front peripheral portion) of the first surface S1 is not covered with a so-called bezel or chassis. Further, the front plate 11 has regions (regions 11a) that expand at right and left ends of the liquid crystal panel 12 as viewed from the front. Speakers 17 are disposed correspondingly to the respective regions 11a. Circular openings are disposed correspondingly to respective speaker elements 17a in each of the regions 11a of the front plate 11.

The liquid crystal panel 12 includes a liquid crystal layer (not illustrated) sealed between two glass substrates, for example, and a polarizing plate is joined to each of surfaces of the liquid crystal panel 12 on light incident side and light emission side. The main components of the liquid crystal panel 12 are each configured by a thin plate-like or sheet-like flexible member made of glass or resin. Thus, the liquid crystal panel 12 as a whole has flexibility. Note that, although an example is given here where a display body 120 includes the liquid crystal panel 12 and the light source section 16, the display body 120 is not limited thereto and may be configured by a panel including a device having other display functions, for example, an organic electroluminescent light-emitting device.

The light source section 16 is a backlight unit that illuminates the liquid crystal panel 12. The light source section 16 includes, for example, an LED light source, a light guide plate, a reflective member, and an optical sheet. Examples of the optical sheet may include a diffuser plate, a diffuser sheet, a lens film, and polarization separation sheet. The light guide plate guides light derived from a light source including, for example, a light emitting diode (LED) or a semiconductor laser toward the liquid crystal panel 12, and includes mainly a transparent thermoplastic resin such as a polycarbonate (PC) resin and an acrylic (for example, polymethylmethacrylate (PMMA)) resin. The reflective member returns light emitted toward the rear side of the light guide plate, for example, to the light guide plate, and is a plate-like or sheet-like member such as foamed polyethylene terephthalate (PET), an evaporated silver film, a multilayer reflective film, and white PET. The reflective member returns light emitted to the rear side of the light guide plate to the light guide plate, for example, and may be a plate-like or sheet-like member such as foamed polyethylene terephthalate (PET), an evaporated silver film, a multilayer reflective film, and white PET. Note that a plate member 40 described later is provided at the rear of the light source section 16.

The frame members 13A, 13B, 14, 15, and 18 are each metallic frame or bracket fastened to a peripheral portion or an outer edge portion of the display body 120. However, the frame member 15 may also be made of resin.

The frame member 13A functions as a bracket that fixes and supports the liquid crystal panel 12, for example, and is disposed to cover each of four sides of the liquid crystal panel 12 having a rectangular shape. As illustrated, for example, in FIG. 3B, the frame member 13A has a plurality of portions (L-shaped bent portions 13a1) disposed at an interval, and each of the portions has a surface to be joined to the liquid crystal panel 12 and a surface to be fastened to the frame member 14. In other words, the frame member 13A has a plurality of cutouts at a predetermined interval. Such a configuration enables the curved shape described later to be followed flexibly.

A frame member 13B functions as a bracket that supports the speaker 17, for example. The frame member 13B is provided, for example, (at right and left ends of the liquid crystal panel 12) along two short sides of the liquid crystal panel 12 with a rectangular shape, and has, for example, circular openings to correspond to the respective elements 17a of the speaker 17. The frame member 18 is a member for fixing the light source section 16 to the liquid crystal panel 12, and is screwed to the light source section 16 (B2 in FIG. 3A).

The frame member 14 is fastened to the liquid crystal panel 12 and the light source section 16 with, for example, the above-described frame members 13A and 18 being interposed in between, respectively, and is provided at the outer edge portion of the display body 120 in a manner extending along the long side of the display body 120 (in the X-direction). In other words, the frame member 14 is provided at each of the top side and the bottom side of the display body 120 in such a manner as to interpose the display body 120. The frame member 14 is processed, for example, such that the shape of a surface facing the display body 120 (XZ planar shape) is a shape of a bow (bow shape), for example. FIG. 4 illustrates an example of the XZ planar shape of the frame member 14. Thus, the frame member 14 has a shape of a bow, in which the frame member 14 is gently curved. As described later in detail, the curved shape in the display body 120 and the front plate 11 is formed and kept to follow the shape of a bow of the frame member 14. Note that the curvature of the shape of a bow of the frame member 14 may be constant throughout the entire region, or may be different between the middle portion and the right and left ends.

The adhesive layer 19A includes, for example, a UV curable resin. It is desirable that a selective portion of the adhesive layer 19A, specifically the peripheral portion of the liquid crystal panel 12 contain microparticles such as beads having substantially the same diameter as the thickness of the adhesive layer 19A. It is particularly desirable that a region along right and left sides of the liquid crystal panel 12 (a region in the Y-direction) contain such microparticles. This is because it is possible to prevent the thickness of the adhesive layer 19A from being decreased locally. Stress is likely to focus on the peripheral portion of the liquid crystal panel 12 due to the curved shape, and thus securing the thickness for an adhesive enables prevention of the occurrence of detachment.

The adhesive layer 19B includes a gluing agent or the adhesive. It is desirable that the adhesive layer 19B have flexibility. This is because it is possible to reduce propagation of stress to the liquid crystal panel 12 from the outside to thereby suppress the occurrence of a display irregularity.

According to the present embodiment, the main body section 10 has a curved shape at least on the front side as illustrated in FIG. 1. More specifically, the front plate 11 has the curved shape that is bent in an arc shape in the X-direction (first direction), for example. The liquid crystal panel 12 of the display body 120 is joined to the rear side (second surface S2 side) of the front plate 11 to follow the curved shape. The curved shape provided by the front plate 11 and the display body 120 is a shape of being bent such that the first surface S1 is concave with respect to the front side (the second surface S2 is convex with respect to the rear side). The curved shape is formed and kept by the frame member 14. In other words, the curved shape of the front plate 11 and the display body 120 follows the bow-shaped arc shape of the frame member 14. This allows the width of a display screen 110A in the vertical direction to gently increase toward the right and left ends from the middle portion when viewing the display unit 1 from the front as illustrated in FIG. 5, thus allowing for generation of a sense of unity and a sense of immersion due to a visual effect of perspective.

Further, the curved shape may be preferably uniform in the Y-direction. This is because a twist is less likely to be applied locally to the liquid crystal panel 12 than a case where the curvature varies in the Y direction, thus making it possible to suppress the occurrence of damage to the liquid crystal panel 12 and display defect of the liquid crystal panel 12.

The stand 20 may be preferably provided, for example, at right and left bottoms of the main body section 10 for the following reasons. In a case where the liquid crystal panel 12 is curved in a convex shape rearward, positions of right and left ends of the main body section 10 are located in front of a position of the center of gravity of the main body section 10. Therefore, the stand 20 is hidden by the main body section 10, and protrusion of the stand 20 toward the front of the main body section 10 is less noticeable than a case where the liquid crystal panel 12 is flat. Moreover, as described later, the speaker is disposed at the right and left ends of the main body section 10, thus making it possible to reliably support the speaker with the stand 20 provided at the right and left bottoms of the main body section 10.

Note that the position of the stand 20 is not limited to the right and left bottoms of the main body section 10; it is also possible to provide the stand 20 at the bottom of a middle portion of the main body section 10. Further, for example, in a case where the curve of the liquid crystal panel 12 is strong, the main body section 10 may also be allowed to stand alone without the stand 20. Position, number, shape, etc. of the stand 20 are not particularly limited.

FIG. 6A illustrates a configuration of the display unit 1 illustrated in FIG. 1, with an exterior member being detached from the display unit 1 as viewed from the rear side. FIG. 6B illustrates a perspective configuration of the plate member 40 and a frame member 50 as viewed from the rear side. Thus, the main body section 10 includes the plate member 40 and the frame member 50 for reinforcement being disposed at the further rear side of the display body 120. The plate member 40 and the frame member 50 are also formed to follow the curved shape of the display body 120. Note that the configuration of the plate member 40 and the frame member 50 is mere an example. Such members for reinforcement may either be provided or not provided. Furthermore, it is also possible to adopt a configuration in which only the plate member 40 is provided without the frame member 50.

The plate member 40 is configured by a flexible plate made of metal or resin. On the rear surface of the plate member 40, a plurality of (in this case, three) frame members 50 are provided in a manner extending in one direction (e.g., X-direction). The plate member 40 is provided with a boss (not illustrated) for fixing the frame member 50. The frame member 50 is provided with a screw hole 54 so as to correspond to the boss, and has, where appropriate, a hole 55 for attachment to a wall-mounting bracket (described later). The hole 55 is a video electronics standard association (VESA) hole.

On the rear surface of the plate member 40, substrates 60 are mounted, such as a source substrate, a timing controller substrate, and a balancer substrate that controls a backlight light source (FIG. 6A). Further, the speaker 17 is disposed at regions corresponding to the right and left ends of the liquid crystal panel 12. By disposing the speaker 17 at the right and left ends of the main body section 10, it becomes possible to integrate image with sound without being separated visually from each other to strengthen a sense of unity and a sense of immersion together with the above-mentioned visual effect of perspective brought by the curved shape.

The speaker 17 may preferably be provided to protrude to the right and the left of the liquid crystal panel 12 and to the rear of the plate member 40. Thus, the capacity of the speaker 17 is secured to allow for an increase in output and an improvement in sound quality. The speaker 17 is a speaker box (speaker system) configured by a plurality of speaker elements 17a as illustrated in FIG. 1, and may be desirably configured by a 4-channel surround speaker, for example. This is because it becomes possible to further strengthen a sense of unity and a sense of immersion with the aid of the above-mentioned visual effect of perspective brought by the curved shape as well as with the aid of sound that spreads frontward, rearward, rightward, and leftward. A specific configuration of the speaker 17 is described later.

(Assembling Method)

The curved shape of the front plate 11 and the display body 120 in the display unit 1 may be formed as follows, for example. FIGS. 7A to 8B are schematic cross-sectional views for describing a method for assembling the display unit 1.

First, the front plate 11 made of a material such as glass and the liquid crystal panel 12 are provided. Thereafter, as illustrated in FIG. 7, the liquid crystal panel 12 is joined to a predetermined region of the second surface S2 of the front plate 11 with the adhesive layer 19A interposed in between.

Subsequently, as illustrated in FIG. 7B, the frame member 13A and the frame member 13B are joined to the peripheral portion of the liquid crystal panel 12 with the adhesive layer 19B interposed in between. Thus, fixing of the liquid crystal panel 12 to the frame member 13A is performable in a state before being bent (in a flat state).

Thereafter, as illustrated in FIG. 7C, the frame member 14 having been processed into the shape of a bow is fastened to the frame member 13A by means of screwing (arrow B1 in FIG. 7C), for example. This allows the front plate 11 and the liquid crystal panel 12 to be bent in an arc shape in the X-direction to follow the shape of a bow of the frame member 14, thus keeping the curved shape.

Next, as illustrated in FIG. 8A, the light source section 16 as a backlight unit is assembled into the space surrounded by the frame members 13a and 14 at the rear side of the liquid crystal panel 12. Subsequently, as illustrated in FIG. 8B, the frame member 18 is screwed to the light source section 16 (arrow B2 in FIG. 8B), and is fitted to the frame members 13A and 14 to thereby fix the light source section 16 to the rear side of the liquid crystal panel 12. This also allows the light source section 16 to be fixed in a state of being bent in an arc shape to follow the curved shape of the liquid crystal panel 12. Thus, the front plate 11 and the display body 120 are integrally formed to provide the curved shape. Note that the above-mentioned reinforcing member such as the plate member 40 may also be attached to the rear side of the light source section 16.

Thereafter, the speaker 17 and the substrates 60 are mounted on the rear side of the light source section 16 with components such as the plate member 40 interposed in between. This fabricates the main body section 10. Finally, the rear surface of the main body section 10 is covered with an unillustrated rear exterior member, and the stand 20 is attached to the right and left bottoms of the main body section 10. This completes the display unit 1 illustrated in FIG. 1.

(Detailed Configuration of Speaker)

FIG. 9A illustrates a configuration of a speaker element 17a in an enlarged manner together with an outer appearance of the main body section 10 on the front side. As illustrated, the speaker element 17a has, for example, a diaphragm 17a1 and an ornamental component 17a2 so as to face an opening portion of the front plate 11. That is, the diaphragm 17a1 and the ornamental component 17a2 of the speaker element 17a are elements that constitute design.

FIG. 9B is a cross-sectional view of a key portion of the speaker element 17a for describing an internal configuration of the speaker element 17a. FIG. 9C is a perspective view of an outer appearance of the speaker element 17a. FIG. 10 illustrates an example of the ornamental component 17a2. The speaker element 17a is mounted with a speaker unit 17a5 that includes a sound generating source, and is fixed to and supported by the front plate 11 so as to interpose the ornamental component 17a2.

The ornamental component 17a2 is a component including an inverted truncated cone-shaped inclined surface and being formed to surround the diaphragm 17a1. The inclined surface of the ornamental component 17a2 has width d1 that is desirably minimized from the view point of quality of design, where the d1 denotes width, d2 denotes height, and θ denotes an inclined angle, as viewed from the front.

The plate member 17a4 is a flat plate-shaped sheet metal, for example. The plate member 17a4 has been subjected to drawing for reinforcement. In other words, the plate member 17a4 is formed into a concave shape as a whole, with an edge thereof (an edge 170) being raised to one surface side.

Here, an edge (an edge 101a) of a plate member 101 that supports the diaphragm 17a1 and the speaker unit 17a5 is typically raised forward (toward the front side, or toward the display side) in the Z-direction as illustrated in FIGS. 11A and 11B. When the above-described ornamental component 17a2 is attached to the front of the plate member 101, a gap between the plate member 101 and the ornamental component 17a2 is more likely to be large in order to secure a space for the height of the edge 101a. As a result, a sound is more likely to be attenuated by the inclined surface of the ornamental component 17a2.

In contrast, the height d2 of the ornamental component 17a2 depends on the structural thickness from the front plate 11 to the plate member 17a4. Accordingly, when the width d1 is decreased for the sake of quality of design, the inclined angle θ increases consequently (the inclined surface becomes acute) since there is a limit for the height d2, thus causing a sound to be attenuated and making the sound less likely to be spread.

In the present embodiment, as illustrated in FIGS. 12A and 12B, the edge 170 of the plate member 17a4 is raised rearward (toward the rear side, or toward the side opposite to the front side) in the Z-direction. Accordingly, when the above-described ornamental component 17a2 is attached to the front of the plate member 17a4, it is not necessary to secure a space for the edge 170 between the plate member 17a4 and the ornamental component 17a2. That is, it is possible to narrow the gap between the plate member 17a4 and the ornamental component 17a2, thereby making the sound more likely to spread at the inclined surface of the ornamental component 17a2. Further, the narrowing of the gap enhances freedom for the inclined angle θ of the ornamental component 17a2. As a result, it becomes possible to decrease the width d1 while suppressing the attenuation of the sound, which is advantageous in enhancement of the quality of design. In addition, the enhancement of the freedom for the inclined angle θ makes it possible to install the speaker element 17a also in the curved surface of the front plate 11 while adjusting the inclined angle θ and the width d1 to desired values. Thus, the enhancement of the freedom in designing the speaker makes it possible, for example, to enhance quality of design while suppressing the influence of the quality of design on sound.

In the foregoing display unit 1, the front plate 11 has the curved shape that is bent in an arc shape in one direction (X-direction). The display body 120 is joined to the rear side (second surface S2 side) of the front plate 11 to follow the curved shape. In such a configuration, light from the light source section 16 passes through the liquid crystal panel 12 to thereby allow predetermined image display to be performed. As illustrated in FIG. 5, the width of the display screen 110A as viewed from the front gently increases toward the right and left ends from the middle portion owing to the foregoing curved shape, to thereby allow for generation of a sense of unity and a sense of immersion due to a visual effect of perspective, thus making it possible to achieve image display full of feeling of presence.

Moreover, according to the present embodiment, the front plate 11 is disposed to allow substantially the entire region of the first surface S1 to be exposed. That is, the peripheral portion of the front surface of the display unit 1 is not covered with a frame-shaped member such as a bezel. This enhances the quality of design.

In addition, the frame member 14 having been processed into the shape of a bow is used to form and support the curved shape of the display body 120 and the front plate 11, thereby enabling the desired curved shape to be easily kept and preventing the display body 120 from being detached from the front plate 11, for example.

Here, FIG. 13 illustrates, as a comparative example, a configuration of a key portion in a case where a frame member 103 (sheet metal) is adhered directly to the peripheral portion of the front plate 11 for fixing, as one example of the structure of joining the display body 120 to the second surface S2 side of the front plate 11. When the frame member 103 is thus fastened to the front plate 11, the curved shape (curvature) is fixed at both ends of the front plate 11 as schematically illustrated in FIG. 14. Therefore, force is more likely to be applied in a direction (arrows X1 in FIG. 14) opposite to the bending direction at both ends of the liquid crystal panel 12 (the liquid crystal panel 12 tries to return to a flat shape). As a result, the liquid crystal panel 12 is more likely to be detached from the front plate 11.

In contrast, according to the present embodiment, the bow-shaped frame member 14 is fastened to the peripheral portion of the liquid crystal panel 12 with the frame member 13A interposed in between (FIG. 3A), thus the curved shape (curvature) is fixed at the peripheral portion of the liquid crystal panel 12 as schematically illustrated in FIG. 15. Therefore, force is more likely to be applied in a direction (arrows X2 in FIG. 14) opposite to the bending direction at both ends of the front plate 11 (the front plate 11 tries to return to a flat shape). That is, according to the present embodiment, force is more likely to be applied in a direction in which the front plate 11 and the liquid crystal panel 12 face each other. As a result, the liquid crystal panel 12 is less likely to be detached from the front plate 11.

Further, since the speaker 17 is disposed at right and left of the liquid crystal panel 12, it becomes possible to integrate image with sound without being separated visually from each other to further strengthen a sense of unity and a sense of immersion together with the above-mentioned visual effect brought by the curved shape of the liquid crystal panel 12. In particular, according to the present embodiment, the edge 170 of the plate member 17a4 is raised rearward (toward the rear side, or toward the side opposite to the front side) in the Z-direction as illustrated in FIGS. 12A and 12B. This enables the gap between the plate member 17a4 and the ornamental component 17a2 to be narrowed, thus making it possible to enhance the freedom in designing the speaker, and making it also possible to easily install the speaker in the curved surface of the front plate 11.

Thus, according to the present embodiment, the front plate 11 that provides the curved shape that is bent in an arc shape in one direction is disposed to allow substantially the entire region of the first surface S1 to be exposed to the display side, and the display body 120 is joined to the second surface S2 side to follow the curved shape. This makes it possible to achieve high-quality design and image display full of feeling of presence.

Modification Example

Description is given next of a modification example of the display unit 1 according to the foregoing embodiment. Hereinafter, the same reference symbol is assigned to a component similar to that in the foregoing embodiment, and description therefor is omitted where appropriate.

Description has been given in the foregoing embodiment referring, as an example, to the case of the stationary type (having the stand 20) in which the display unit 1 is used while being placed on a table, for example. However, the display unit 1 may also be used while being fixed on a wall, for example, in the present modification example. FIG. 16 illustrates an example of a wall-mounted display unit. FIGS. 17A and 17B are side views of the main body section 10 being attached to a wall S3. According to the present modification example as illustrated, a fixture 21, in place of the stand 20, is attached (attachable) to the rear side of the main body section 10.

The fixture 21 includes, for example, a support member 21A as a bracket that fixes and supports the main body section 10, and a support member 21B as a base plate that is fixed to the wall. Note that a configuration of the fixture 21 described herein is mere an example, and is not limited to this configuration. Other members may also be further included, or the members may have different shapes.

The support members 21A and 21B may be fixed, for example, to the VESA hole 55 provided on the frame member 50 at the rear side of the main body section 10 by means of screwing. The support member 21A has an arm 21a1, for example, and enables gradual adjustment of an installing angle using the arm 21a1 as illustrated in FIGS. 17A and 17B. In FIG. 17A, the arm 21a1 is folded to allow the main body section 10 to be attached substantially vertically to the wall surface. In FIG. 17B, the arm 21a1 is extended to allow the main body section 10 to be attached in an inclined manner to the wall surface.

Although description has been given heretofore with reference to the embodiment and the modification example, the disclosure is by no means limited to the foregoing embodiment and the modification example, and various modifications are possible. For example, although the description has been given, in the foregoing embodiments and the modification example, of the case where the front plate 11 and the display body 120 are curved throughout the entire region in the X-direction, being curved throughout the entire region is not necessary. Being curved in a portion (e.g., flat at the middle portion while being curved in right and left portions) in the X-direction is also possible. Further, a curvature of the curved portion is not necessarily constant, and the curved portion may be formed such that the curvature varies from the middle portion toward the right and left portions. The curvature may be different locally. It is desirable that a proper curvature be set depending on, for example, an aspect ratio or a diagonal size of the display screen.

Further, although the display body 120 including the liquid crystal panel 12 and the light source section 16 is described as an example of the display body 120 in the foregoing embodiment, the display body of the present disclosure is not limited to a display body using the liquid crystal panel, and may be a display body using a structure having other display functions. For example, use of an organic electroluminescence (EL) panel is also allowable in place of the liquid crystal panel 12 and the light source section 16.

Furthermore, for example, the material and the thickness of each of the layers described in the foregoing embodiment are not limited, and other materials and other thicknesses may also be adopted.

In addition, although description has been given, referring specifically to the configuration of the display unit 1 (television) in the foregoing embodiment, it is not necessary to provide all the components, and other components may also be provided further.

The present disclosure is widely applicable to, besides the television described in the foregoing embodiment, electronic apparatuses in every field, such as monitors of personal computers (PCs) and public displays, that display, as an image or a picture, an image signal received from outside or an image signal generated inside.

Note that the effects described in the foregoing embodiment are merely illustrative, and may be effects other than those described above or may further include other effects.

Note that the disclosure may have the following configurations.

(1)

A display unit including:

a transparent plate having a first surface and a second surface that are opposite to each other, and disposed to allow substantially an entire region of the first surface to be exposed, the transparent plate having a curved shape that is bent in an arc shape in a first direction; and a display body joined to side of the second surface of the transparent plate to follow the curved shape.

(2)

The display unit according to (1), further including a first frame member that is provided on an outer edge portion of the display body in the first direction and keeps the curved shape.

(3)

The display unit according to (2), wherein the first frame member is processed to allow a shape of a surface facing the display body to be a shape of a bow.

(4)

The display unit according to (2) or (3), further including a second frame member that is joined to a peripheral portion of a liquid crystal panel of the display body and supports the liquid crystal panel, wherein the display body includes the liquid crystal panel and a light source section that emits light toward the liquid crystal panel, and the first frame member is fastened to the second frame member by a screw.

(5)

The display unit according to (4), wherein the second frame member includes a plurality of L-shaped portions each having a surface joined to the liquid crystal panel and a surface fastened to the first frame member, the plurality of L-shaped portions being disposed at an interval from each other.

(6)

The display unit according to (4) or (5), further including a third frame member that is provided at the outer edge portion of the display body and fixes the light source section to the liquid crystal panel.

(7)

The display unit according to any one of (1) to (6), further including an adhesive layer provided between the liquid crystal panel and the transparent plate and containing microparticles.

(8)

The display unit according to (7), wherein the adhesive layer contains the microparticles in a region, out of the peripheral portion of the liquid crystal panel, in a second direction orthogonal to the first direction.

(9)

The display unit according to any one of (1) to (8), further including a speaker provided at a region along each of short sides of the transparent plate having a rectangular shape, the transparent plate having a surface shape that is the rectangular shape with the first direction being a longitudinal direction.

(10)

The display unit according to (9), wherein the speaker includes a 4-channel surround speaker.

(11)

The display unit according to (9) or (10), wherein
the speaker includes:
a speaker unit;
a diaphragm;
a plate member that supports the diaphragm and has an edge portion that is raised toward side opposite to a display side; and
an ornamental member that is attached closer to the display side than the plate member and includes an inverted truncated cone-shaped inclined surface formed to surround the diaphragm.

(12)

The display unit according to any one of (1) to (11), wherein the transparent plate is made of glass.

(13)

The display unit according to any one of (1) to (12), wherein the curved shape is formed by the first surface bent in a concave shape.

This application is based upon and claims the benefit of priority of the Japanese Patent Application No. 2014-159574 filed with the Japan Patent Office on Aug. 5, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit, comprising:
   a transparent plate that includes a first surface and a second surface,
   wherein the first surface is opposite to the second surface,
   wherein the first surface and the second surface are arranged such that an entire region of the first surface is exposed,
   wherein the first surface corresponds to a display side of the transparent plate, and
   wherein the transparent plate has a curved shape that is bent in an arc shape in a first direction;
   a display body, connected to the second surface of the transparent plate, has the curved shape based on the curved shape of the transparent plate; and
   a first frame member connected to an outer edge portion of the display body in the first direction, wherein the first frame member is opposite to the first surface.

2. The display unit according to claim 1, wherein the first frame member has the curved shape based on the curved shape of the display body.

3. The display unit according to claim 1, wherein a shape of a surface of the first frame member that faces the display body is of a bow.

4. The display unit according to claim 1, further comprising a second frame member that is connected to a peripheral portion of a liquid crystal panel of the display body and supports the liquid crystal panel,
   wherein the display body includes the liquid crystal panel and a light source section, wherein the light source section is configured to emit light toward the liquid crystal panel, and
   wherein the first frame member is connected to the second frame member by a screw.

5. The display unit according to claim 4,
   wherein the second frame member includes a plurality of L-shaped portions,
   wherein a first surface of each of the plurality of L-shaped portions is connected to the liquid crystal panel and a second surface of each of the plurality of L-shaped portions is connected to the first frame member, and
   wherein each pair of adjacent L-shaped portions of the plurality of L-shaped portions is separated by an interval.

6. The display unit according to claim 4, further comprising a third frame member that is connected to the outer edge portion of the display body and, wherein the third frame member fixes the light source section to the liquid crystal panel.

7. The display unit according to claim 1, further comprising an adhesive layer between a liquid crystal panel and the transparent plate, wherein the adhesive layer includes microparticles.

8. The display unit according to claim 7, wherein the adhesive layer includes the microparticles in a region, of a peripheral portion of the liquid crystal panel, in a second direction that is orthogonal to the first direction.

9. The display unit according to claim 1, further comprising a speaker at a region along each of short sides of the transparent plate that has a rectangular shape,
   wherein the first direction is a longitudinal direction.

10. The display unit according to claim 9, wherein the speaker comprises a 4-channel surround speaker.

11. The display unit according to claim 9, wherein the speaker includes:
    a speaker unit;
    a diaphragm;
    a plate member that supports the diaphragm and has an edge portion that is raised towards a side that is opposite to the display side; and
    an ornamental member that is attached closer to the display side than the plate member, wherein the ornamental member includes an inverted truncated cone-shaped inclined surface that surrounds the diaphragm.

12. The display unit according to claim 1, wherein the transparent plate is of glass.

13. The display unit according to claim 1, wherein the curved shape is formed based on a concave shape of the first surface.

* * * * *